(12) United States Patent
Barber et al.

(10) Patent No.: US 9,962,828 B2
(45) Date of Patent: May 8, 2018

(54) END-OF-ARM TOOL

(71) Applicant: CORNING INCORPORATED, Corning, NY (US)

(72) Inventors: Devin Joe Barber, Watkins Glen, NY (US); Nils Paul Fornell, Harrodsburg, KY (US); Tzu-Hen Hsu, Taichung (TW); Brian Keith Markham, Harrodsburg, KY (US); Andrew Nathan Nassau, Philadelphia, PA (US)

(73) Assignee: Corning Incorporated, Corning, NY (US)

( * ) Notice: Subject to any disclaimer, the term of this patent is extended or adjusted under 35 U.S.C. 154(b) by 0 days. days.

(21) Appl. No.: 15/501,904

(22) PCT Filed: Jul. 31, 2015

(86) PCT No.: PCT/US2015/043188
§ 371 (c)(1),
(2) Date: Feb. 6, 2017

(87) PCT Pub. No.: WO2016/022426
PCT Pub. Date: Feb. 11, 2016

(65) Prior Publication Data
US 2017/0225323 A1    Aug. 10, 2017

Related U.S. Application Data

(60) Provisional application No. 62/033,438, filed on Aug. 5, 2014.

(51) Int. Cl.
*B25J 15/06* (2006.01)
*B25J 9/00* (2006.01)
*B65G 49/06* (2006.01)

(52) U.S. Cl.
CPC ......... *B25J 9/0012* (2013.01); *B25J 15/0616* (2013.01); *B65G 49/067* (2013.01)

(58) Field of Classification Search
CPC .. B25J 9/0012; B25J 15/0616; B25J 15/0683; B65G 47/918; B65G 49/067; B66C 1/0237; B66C 1/0243; B66C 1/0281
(Continued)

(56) References Cited

U.S. PATENT DOCUMENTS 3,183,032 A * 5/1965 Warfel ................. B66C 1/0231
                                                                         294/65
3,865,359 A * 2/1975 Caroli .................. B25B 11/005
                                                                         269/21

(Continued)

FOREIGN PATENT DOCUMENTS

CN      202336869 U     7/2012
CN      202626024 U    12/2012
(Continued)

*Primary Examiner* — Dean J Kramer
(74) *Attorney, Agent, or Firm* — Ryan T. Hardee (57) ABSTRACT

An end-of-arm tool is described and includes an outer sheet and an inner sheet. The end-of-arm tool may be reinforced with a backing plate attached to the inner sheet and a front plate attached to the outer sheet. The end-of-arm tool may also include spacers to provide structure and rigidity to the end-of-arm tool at passages configured for the installation of workpiece interface tools, for example, spring plungers.

14 Claims, 7 Drawing Sheets

(58) Field of Classification Search
USPC .......................................... 294/183, 188, 65
See application file for complete search history.

(56) References Cited

U.S. PATENT DOCUMENTS

| | | | | |
|---|---|---|---|---|
| 4,793,657 A | * | 12/1988 | Mense | B25J 15/0616 271/91 |
| 5,048,811 A | * | 9/1991 | Hochbein | B65H 3/0816 271/104 |
| 6,860,534 B2 | * | 3/2005 | Vogel | B65G 47/918 294/188 |
| 7,611,180 B1 | * | 11/2009 | Fisher | B25J 15/0052 294/65 |
| 8,025,277 B2 | | 9/2011 | Lin et al. | |
| 8,376,431 B2 | * | 2/2013 | Na | H01L 21/6838 294/65 |
| 8,414,045 B2 | * | 4/2013 | Schaaf | B25J 15/0616 269/21 |
| 9,126,857 B2 | | 9/2015 | Hill et al. | |
| 2003/0107227 A1 | * | 6/2003 | Nagler | B25J 15/0616 294/188 |
| 2008/0203641 A1 | | 8/2008 | Reed et al. | |
| 2008/0256789 A1 | | 10/2008 | Fisch et al. | |
| 2008/0279999 A1 | | 11/2008 | Duchesne et al. | |
| 2009/0320417 A1 | | 12/2009 | Gilmore | |
| 2011/0030318 A1 | | 2/2011 | Moylan et al. | |
| 2016/0121488 A1 | * | 5/2016 | Kraft | B25J 9/0012 414/729 |

FOREIGN PATENT DOCUMENTS

| | | |
|---|---|---|
| DE | 102006017763 B4 | 12/2009 |
| JP | 10100084 A | 4/1998 |
| WO | 2014209833 A1 | 12/2014 |

\* cited by examiner

END-OF-ARM TOOL

CROSS-REFERENCE TO RELATED APPLICATIONS

This application claims the benefit of priority under 35 U.S.C. § 371 of International Patent Application Serial No. PCT/US15/43188, filed on Jul. 31, 2015, which in turn, claims the benefit of priority of U.S. Provisional Patent Application Ser. No. 62/033,438 filed on Aug. 5, 2014, the contents of each of which are relied upon and incorporated herein by reference in their entireties.

BACKGROUND

The present disclosure relates generally to an end-of-arm tool for use on a robot, and more particularly, to a lightweight end-of-arm tool useful for packing glass sheets at faster cycle times.

Conventional end-of-arm tools for use with a robot are adjustable and designed to accommodate different work piece configurations. Such adjustable tools, however, are complicated and typically heavy. Thus, a robot handling such complicated, heavy tools is subjected to increased wear resulting in reduced life and lost production. There exists a need for an improved, lightweight end-of-arm tool that would reduce such wear on the robot. An advantage to such a lightweight tool is a decrease in cycle times. Furthermore, as modern glass sheets become larger and thinner, a lightweight end-of-arm tool must also become larger and still provide the support that modern glass sheets require while maintaining a lightweight capability and reduction in wear.

BRIEF SUMMARY

One embodiment of the present disclosure provides a lightweight end-of-arm tool made of two sheets that are bonded/attached together. These sheets may be formed from a polymeric material and, in some embodiments, may be made by vacuum molding or injection molding. The sheets may be bonded together with adhesive, ultrasonic welding or mechanical fasteners. When bonded together, the combined sheets may define a cavity into which a supporting core may be inserted for strength.

Another embodiment of the present disclosure provides a lightweight end-of-arm tool made of two sheets that are bonded/attached together. The sheets may be formed from a polymeric material and, in some embodiments, may be made by vacuum molding or injection molding and may be bonded together with adhesive, ultrasonic welding or mechanical fasteners. The combined bonded sheets may be reinforced with outer center hub plates for strength.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to embodiments of the present disclosure, examples of which are illustrated in the accompanying drawings. Whenever possible, the same reference numerals will be used throughout the drawings to refer to the same or like parts.

Figure 1:
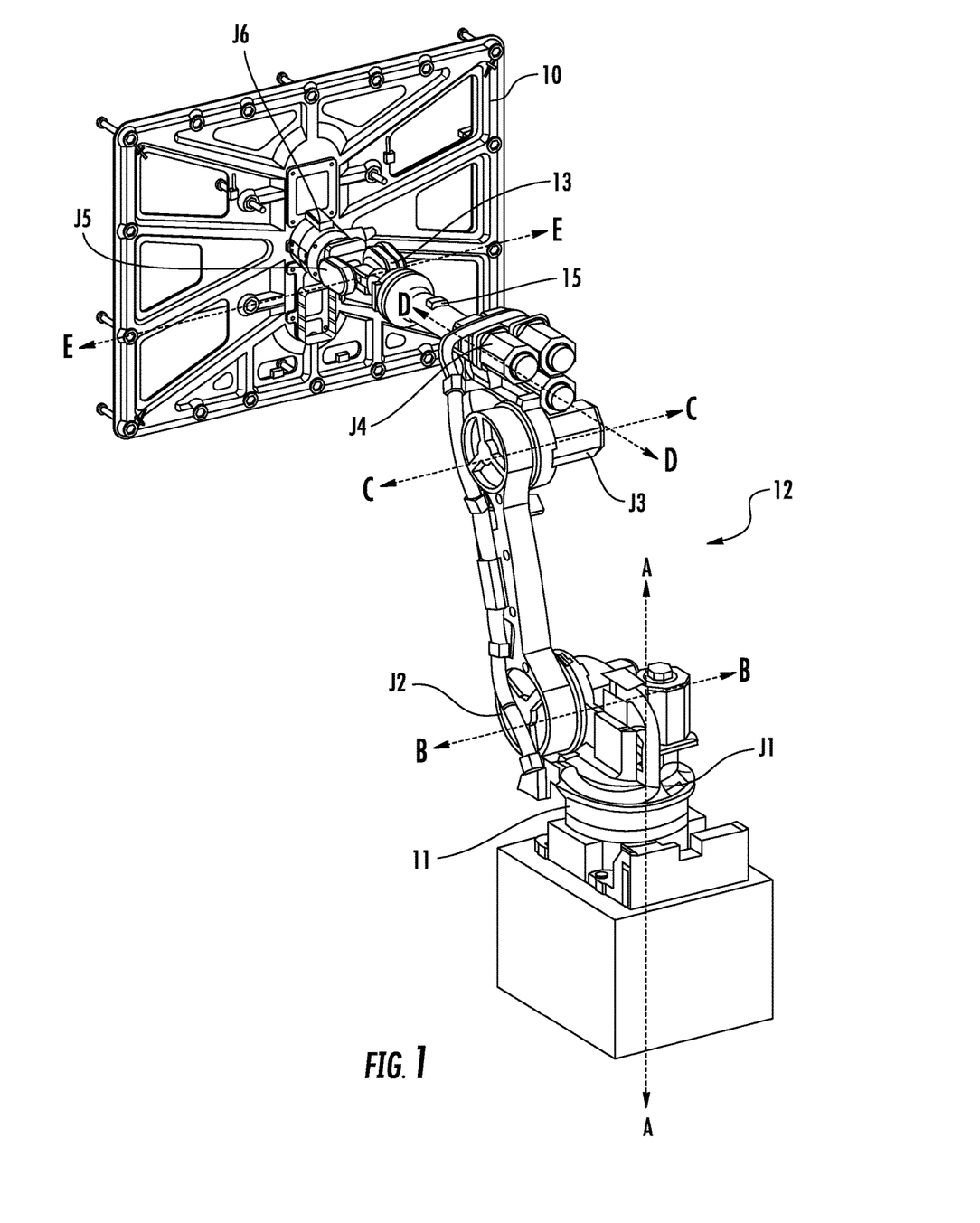
FIG. 1 is a perspective view of a robot with an end-of-arm tool of the present disclosure.

FIG. 1 is a perspective view of a robot 12 having a multi-axis arm 15 with an end-of-arm tool 10 of the present disclosure. With reference to FIG. 1, the robot 12 may be a conventional commercially-available robot. The embodiment shown in FIG. 1 can include six motors J1 through J6. Of course, the claims appended herewith should not be so limited as the robot 12 can include any number of motors configured to pivot an article about multiple axes.

A first motor J1 can be located at the base or pedestal 11 of the robot 12 and used to control movement of the robot about a first axis A-A. A second motor J2 can be located proximate the base or pedestal 11 of the robot and used to control movement of the multi-axis arm 15 about axis B-B. A third motor J3 can be located distal the base or pedestal 11 of the robot and used to control movement of the multi-axis arm about axis C-C. Axes B-B and C-C, in some embodiments, can be perpendicular to axis A-A. A fourth motor J4 can be located distal or proximate to the end of arm tool 10 and used to control movement of the tool 10 longitudinally along axis D-D. A fifth motor J5 can be located proximate the end-of-arm tool 10 and can be used to control movement of the tool 10 about axis E-E perpendicular to axis D-D. A sixth motor J6 can be located proximate the end of arm tool 10 and can be used to control movement of the tool 10 rotationally about axis D-D.

Through use of such non-limiting motors, an exemplary end-of-arm tool 10 can thus be positionable at the end 13 of the robot arm 15 to engage work pieces, in some embodiments, glass sheets.

Figure 2:
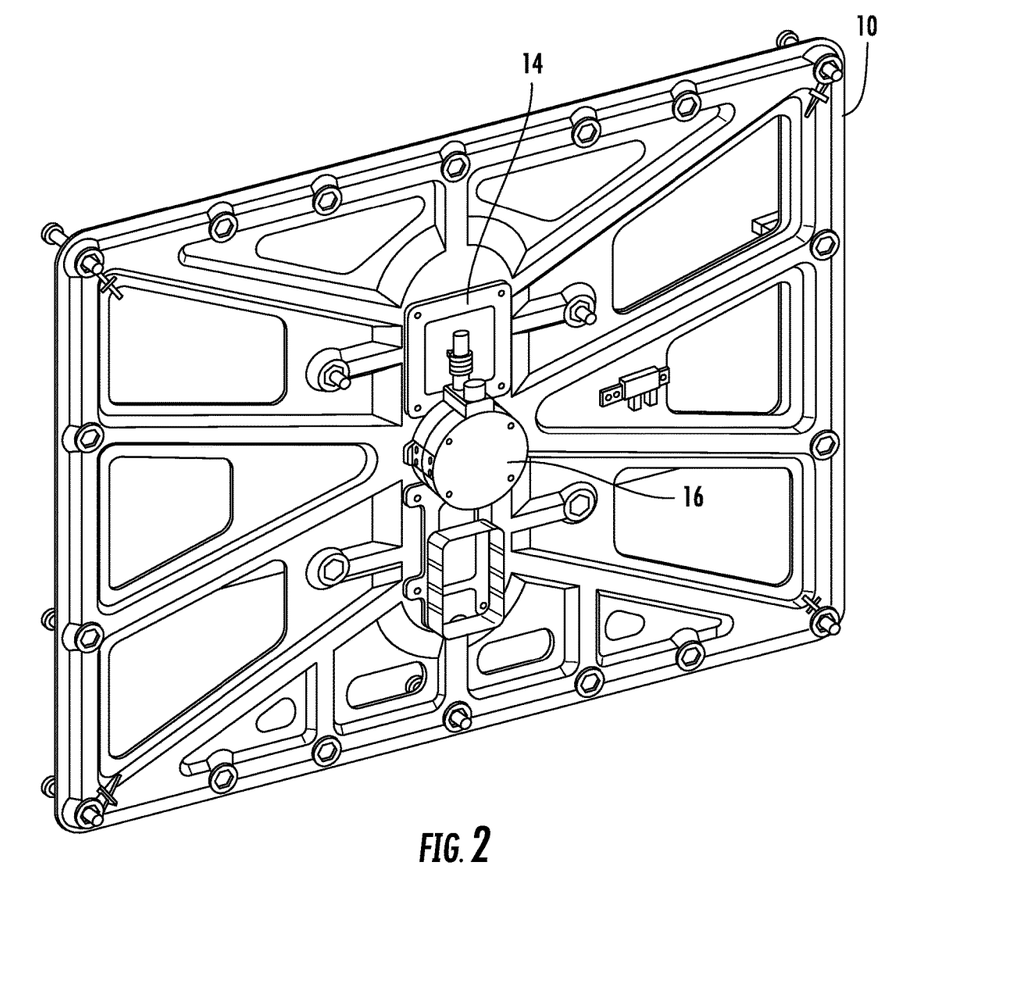
FIG. 2 is a perspective view of an end-of-arm tool of the present disclosure.

FIG. 2 is a perspective view of an end-of-arm tool 10 of the present disclosure. With reference to FIG. 2, an exemplary embodiment can include a reinforcement mechanism. In the depicted, non-limiting embodiment, the reinforcement mechanism is a mounting plate 14 along with an auto tool change connector 16. The mounting plate 14 may be of any conventional design and can provide strength and reinforcement to an exemplary end-of-arm tool 10. The auto tool change connector 16 can be used for ease of connection/disconnection of the end-of-arm tool 10 to other robots.

Figure 3:
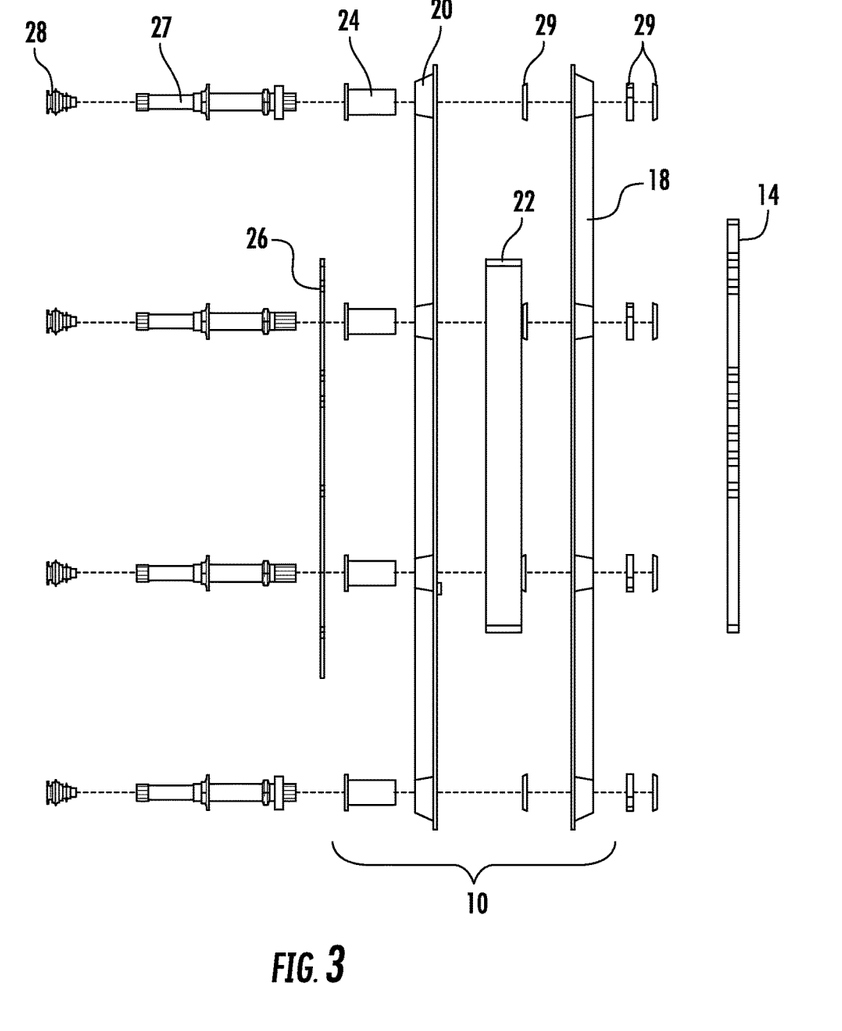
FIG. 3 is an exploded side view of an end-of-arm tool of the present disclosure.

FIG. 3 is an exploded side view of an exemplary end-of-arm tool 10 of the present disclosure. With reference to FIG. 3, the end-of-arm tool 10 can include an inner sheet 18 and an outer sheet 20. The inner sheet 18 and the outer sheet 20 can be formed from thin and lightweight materials. Suitable materials for these sheets 18, 20 include, but are not limited to, polymeric materials, thermosetting polymers, thermoplastics, other suitable plastic materials, carbon fiber materials, and the like. In embodiments where the inner sheet 18 and the outer sheet 20 are made from a polymeric material, these sheets may be formed by vacuum molding, injection molding or another suitable forming process. In some embodiments of the present disclosure, the inner sheet 18 and the outer sheet 20 may each have a thickness of between about 0.2 mm to about 6.0 mm and all subranges therebetween.

In some non-limiting embodiments, the end-of-arm tool 10 may also include a core 22. The core 22 can be used to reinforce and strengthen the inner sheet 18 and the outer sheet 20 when connected. In some non-limiting embodiments, the inner sheet 18 and the outer sheet 20 may also be connected to each other by adhesive bonding, ultrasonic welding, or another suitable connecting mechanism (e.g., screws, rivets, etc.).

Figure 4:
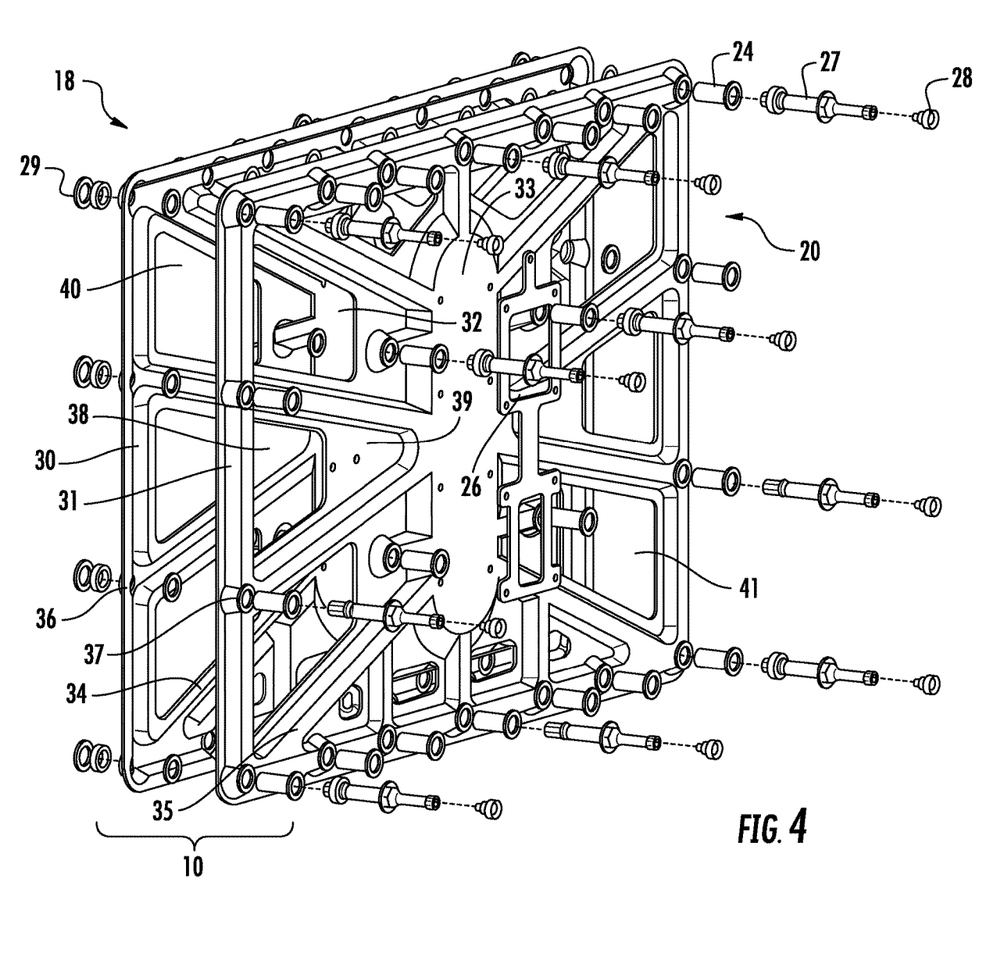
FIG. 4 is an exploded, perspective view of an end-of-arm tool of the present disclosure.

The end-of-arm tool 10 may also include a plurality of spacers 24 used to align passages 36 (see FIG. 4). In some embodiments, the spacer 24 may provide reinforcing strength to the end-of-arm tool 10 so that when a plurality of workpiece interface tools, shown here as spring plungers 27, are fixed to the end-of-arm tool 10 with hardware 29, the spacers 24 provide a support so that the hardware 29 will not crush the end-of-arm tool 10. In some embodiments of the present disclosure, the spacers 24 may provide a bearing surface for the installation of the spring plungers 27 and the hardware 29. The plurality of spacers 24 can be made of a lightweight metal, such as aluminum or another suitable material.

The outer sheet 20 may be reinforced on its outside with a suitable reinforcing mechanism such as, but not limited to, a clamp plate 26. As noted above, the inner sheet 18 may be reinforced on its outside face with a suitable reinforcing mechanism as well, such as the mounting plate 14. In some embodiments, the mounting plate 14 can function as the point of attachment for the auto tool change connector 16 and robot arm 15 (see FIG. 1).

FIG. 4 is an exploded, perspective view of an end-of-arm tool 10 of the present disclosure. The inner sheet 18 can include an inner peripheral member or boundary 30, an inner portion or center hub 32, and a plurality of inner ribs 34 connecting the inner center hub 32 and the inner peripheral member 30. The outer sheet 20 can include an outer peripheral member or boundary 31, an outer portion or center hub 33, and a plurality of outer ribs 35 connecting the outer center hub 33 and the outer peripheral member 31.

In some embodiments of the present disclosure, the inner peripheral member 30 and the outer peripheral member 31 may include a channel construction (see FIG. 5) that can provide strength and rigidity to the peripheral members 30, 31. Similarly, each inner rib 34 and outer rib 35 may include a similar channel construction (see FIG. 5) for strength and rigidity.

In some embodiments of the present disclosure, with respect to the inner sheet 18, the inner peripheral member 30, the inner ribs 34 and the inner center hub 32 may define an inner web 38 having a plurality of voids 40. With respect to the outer sheet 20, the outer peripheral member 31, the outer ribs 35 and the outer center hub 33 may define an outer web 39 having a plurality of voids 41. These webs 38, 39 may be used to provide further structure and rigidity to an exemplary end-of-arm tool 10.

With continued reference to FIG. 4, the inner sheet 18 can include a plurality of inner sheet passages 36 and the outer sheet 20 can include a plurality of outer sheet passages 37. When the inner sheet 18 is connected to the outer sheet 20, the respective passages 36, 37 can align to create a shaft into which an affixing mechanism can be used to connect the sheets together. In some embodiments, a non-limiting affixing mechanism can include a spring plunger 27 with a vacuum cup 28 inserted and fixed into place with hardware 29. Of course, other suitable affixing mechanisms are envisioned by this disclosure and such a depiction should not limit the scope of the claims appended herewith. As noted above, the plurality of spacers 24 can also be aligned with the passages 36, 37 to provide a rigid construction that cannot be crushed by the installation of suitable affixing mechanisms such as spring plungers 27.

In some embodiments, the voids 40, 41 may provide openings permitting air to pass through the end-of-arm tool 10 when the end-of-arm tool 10 is attached to a robot 12 (see FIG. 1) thereby eliminating air resistance during movement of the end-of-arm tool 10 and resulting in a reduction of weight.

Figure 5:
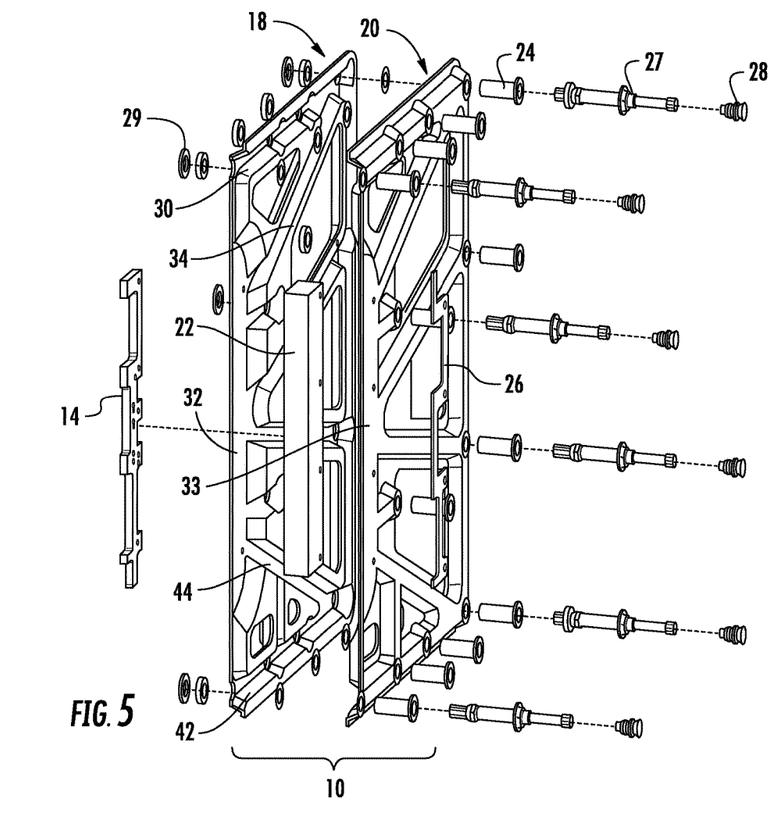
FIG. 5 is an exploded, cross-sectional perspective view of a mounting plate for use with an end-of-arm tool of the present disclosure.

FIG. 5 is an exploded cross-sectional perspective view of a mounting plate for use with an end-of-arm tool 10 of the present disclosure. With reference to FIG. 5, the inner center hub 32 of the inner sheet 18 can align with the outer center hub 33 of the outer sheet 20 to create a cavity accommodating an exemplary core 22. In some non-limiting embodiments, the core 22 may be of a honeycomb construction or other similar reinforcing construction that may bring reinforcement, lightweight and rigidity to the end-of-arm tool 10. In other embodiments, the core 22 can be made of a lightweight metal, such as aluminum or other suitable material. FIG. 5 also illustrates the channel construction of the inner peripheral member 30 and the inner rib 34. For example, in some embodiments of the present disclosure, the inner peripheral member 30 can include the peripheral member channel 42 and the inner rib 34 can include the rib channel 44. The outer peripheral member 31 and the outer ribs 35 may include a similar channel construction.

As noted above, the inner sheet 18 may be reinforced with a reinforcing mechanism such as a mounting plate 14, and the outer sheet may be reinforced with a reinforcing mechanism such as a clamp plate 26. Exemplary hardware 29 may be used to connect the inner sheet 18 and the outer sheet 20 and these sheets 18, 20 may also be bonded together with adhesive, ultrasonic welding, or other suitable affixing mechanisms. When the inner sheet 18 and the outer sheet 20 are connected, the spacers 24 may provide the end of arm tool 10 with a rigid construction that cannot be crushed when the hardware 29 is used to install the workpiece interface tools, such as the spring plungers 27 and suction cups 28.

Figure 6:
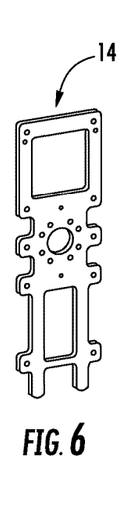
FIG. 6 is a perspective view of a suitable reinforcing mechanism for use with an end-of-arm tool of the present disclosure.

FIG. 6 is a perspective view of a suitable reinforcing mechanism for use with an end-of-arm tool 10 of the present disclosure. With reference to FIG. 6, a suitable reinforcing mechanism can be, but is not limited to, an exemplary mounting plate 14 that can take any shape conforming to the shape of the center hub 32 of the inner sheet 18. The mounting plate 14 can also provide the structure for attaching the auto tool change connector 16 (see FIG. 3). The mounting plate 14 can be made of a lightweight metal, such as aluminum or another suitable material.

Figure 7:
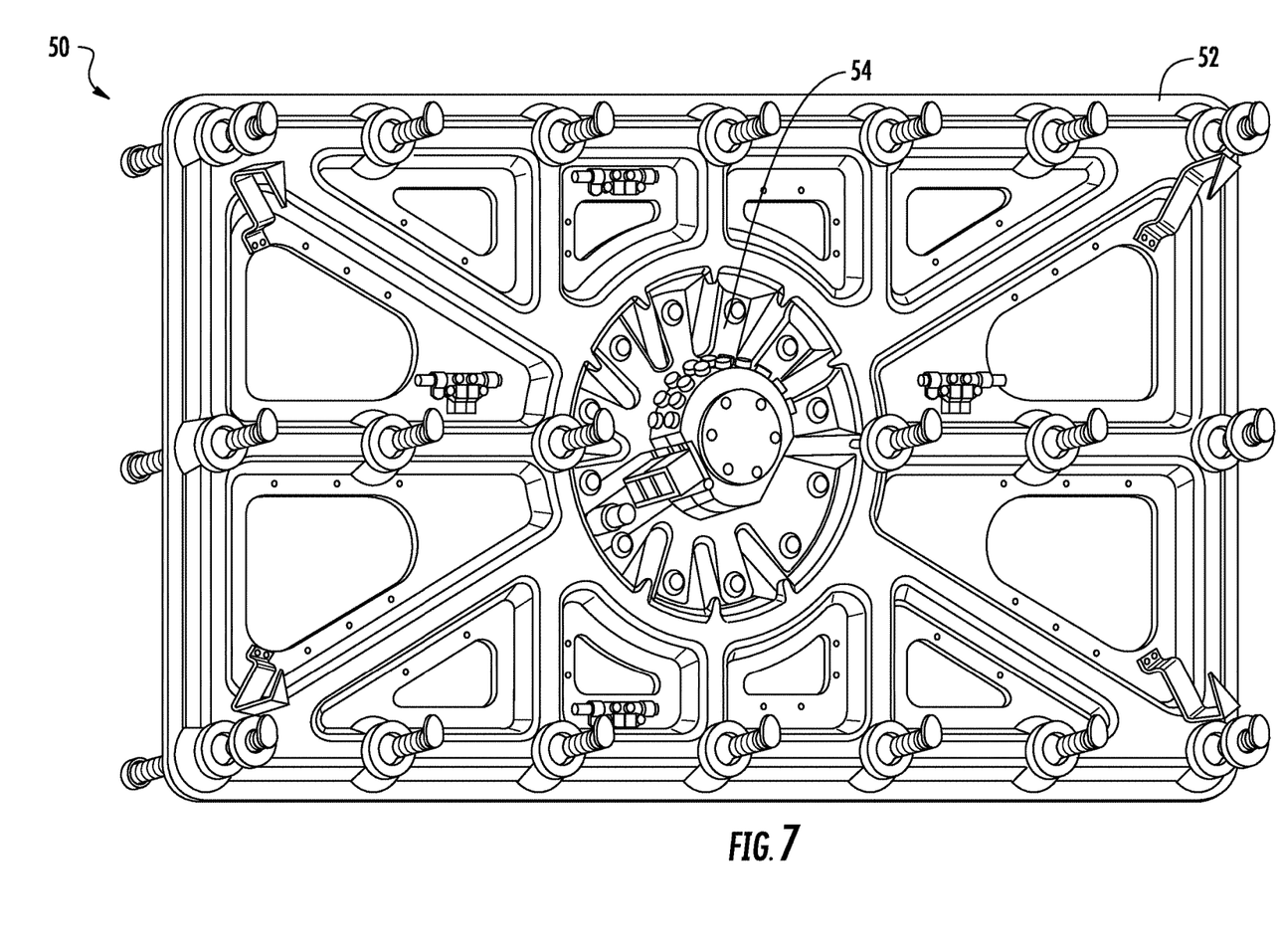
FIG. 7 is a perspective view of another end-of-arm tool of the present disclosure.
Figure 8:
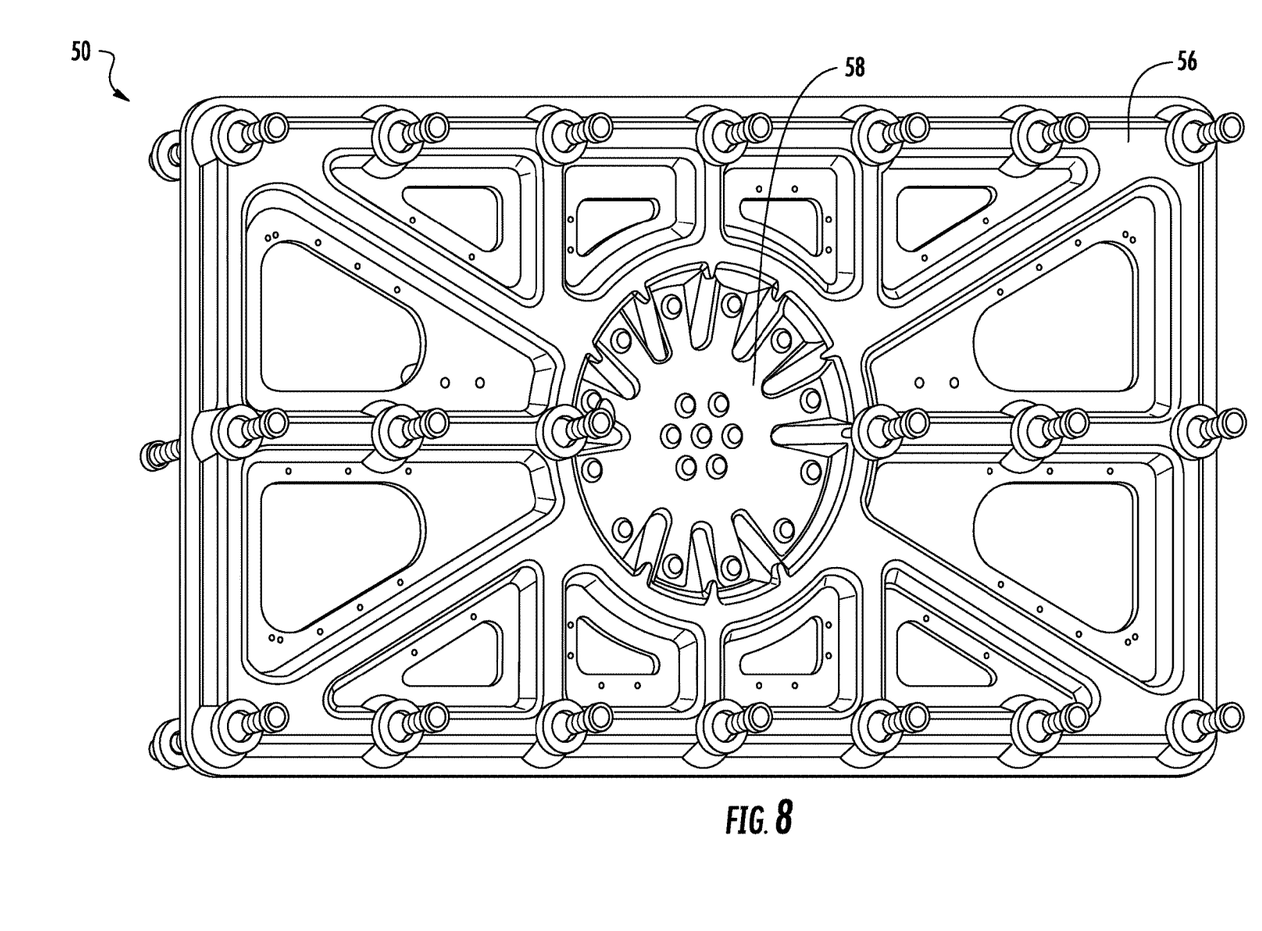
FIG. 8 is a perspective view of another end-of-arm tool of the present disclosure.

FIGS. 7 and 8 are perspective views of another end-of-arm tool 50 of the present disclosure. With reference to FIGS. 7 and 8, the depicted end-of-arm tool 50 does not include a core 22 illustrated in FIGS. 3 and 5. Rather, a backing plate 54 may be attached to an inner sheet 52 and a front plate 58 may be attached to an outer sheet 56. The backing plate 54 and the front plate 58 attached to the inner sheet 52 and the outer sheet 56, respectively, may be used to provide the end-of-arm tool 50 with the reinforcement and rigidity necessary to function in its intended environment of manipulating work pieces, e.g., glass sheets. The backing plate 54 and the front plate 58 can be made of a light weight metal, such as aluminum or other suitable materials.

Several advantages may be gained by embodiments of the present disclosure. For example, a standard size glass sheet may be 1.020 m×1.360 m, 1.300 m×1.520 m, 1.460 m×1.520 m, or 1.600 m×1.910 m. A conventional end-of-arm tool necessary to manipulate such standard sized glass sheets may weigh about 161 kg. In contrast, an end-of-arm tool of the present disclosure would weigh less than about 43.5 kg. Due to the lightweight nature of embodiments described herein the lifespan of motors in an exemplary robot may be extended. Tables 1-3 provide evidence of such advantages for a non-limiting robot depicted in FIG. 1 having motors J1 through J6.

TABLE 1

| Lifespan | Prior Art Tool (161 kg) | Present Disclosure Tool (43.5 kg) | % Improvement |
|---|---|---|---|
| J1 (yrs) | 8 | 8 | 0.0% |
| J2 (yrs) | 2.6 | 8 | 207.7% |
| J3 (yrs) | 2.8 | 8 | 185.7% |
| J4 (yrs) | 8 | 8 | 0.0% |
| J5 (yrs) | 8 | 8 | 0.0% |
| J6 (yrs) | 8 | 8 | 0.0% |

With reference to Table 1, this data demonstrates that an end-of-arm tool of the present disclosure can prolong the lifespan of several motors J2 and J3, of an exemplary robot.

TABLE 2

| Overheat | Prior Art Tool (161 kg) | Present Disclosure Tool (43.5 kg) | % Change |
|---|---|---|---|
| J1 | 25.4% | 25.8% | 1.6% |
| J2 | 95.2% | 58.8% | −38.2% |
| J3 | 96.6% | 56.7% | −41.3% |
| J4 | 26.6% | 20.3% | −23.7% |
| J5 | 26.9% | 19.6% | −27.1% |
| J6 | 15.6% | 16.1% | 3.2% |

With reference to Table 2, it can be demonstrated that an exemplary end-of-arm tool of the present disclosure can reduce the percentage of overheat of motors J2, J3, J4, and J5 of an exemplary robot.

TABLE 3

| Over Current | Prior Art Tool (161 kg) | Present Disclosure Tool (43.5 kg) | % Change |
|---|---|---|---|
| J1 | 1.3% | 1.4% | 7.7% |
| J2 | 37.9% | 14.7% | −61.2% |

TABLE 3-continued

| Over Current | Prior Art Tool (161 kg) | Present Disclosure Tool (43.5 kg) | % Change |
|---|---|---|---|
| J3 | 27.0% | 12.9% | −52.2% |
| J4 | 3.2% | 1.5% | −53.1% |
| J5 | 3.3% | 1.4% | −57.6% |
| J6 | 1.3% | 1.4% | 7.7% |

With reference to Table 3, it can be demonstrated that an exemplary end-of-arm tool of the present disclosure can reduce the percentage of over current of motors J2, J3, J4, and J5.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a rib member" includes examples having two or more such "rib members" unless the context clearly indicates otherwise. Likewise, a "plurality" is intended to denote "more than one." As such, a "plurality of rib members" includes two or more such rib members, such as three or more such rib members, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A tool for a robot:
an outer sheet having a first plurality of passages and having a first peripheral member, a first center hub and a first plurality of ribs forming a first web, the first web defining a first plurality of voids;
an inner sheet connected to the outer sheet and having a second plurality of passages and a mounting surface and having a second peripheral member, a second center hub and a second plurality of ribs forming a second web, the second web defining a second plurality of voids, the mounting surface configured to mount the tool to a proximate robot;
a plurality of spacers; and
a core intermediate the first center hub and the second center hub;
wherein the first plurality of passages are aligned with the second plurality of passages forming a plurality of shafts configured to accommodate one or more workpiece interface tools, the plurality of spacers are aligned with the plurality of shafts and configured to provide support for the one or more workpiece interface tools, and the first center hub and the second center hub align to define a cavity configured to accept the core, and wherein the core includes a honeycomb structure.

2. The tool of claim 1, wherein the outer sheet is connected to the inner sheet with adhesive.

3. The tool of claim 1, further comprising a mounting plate attached to the inner sheet at the mounting surface.

4. The tool of claim 1, wherein the one or more workpiece interface tools comprises one or more spring plungers.

5. The tool of claim 1, wherein the first peripheral member includes a first channel and the second peripheral member includes a second channel.

6. The tool of claim 1, wherein each of the first plurality of ribs comprises a third channel and each of the second plurality of ribs comprises a fourth channel.

7. The tool of claim 1, wherein the outer sheet is made of polymeric materials, thermosetting polymers, thermoplastics, or carbon fiber materials and the inner sheet is made of polymeric materials, thermosetting polymers, thermoplastics, or carbon fiber materials.

8. The tool of claim 1, wherein the core is made of aluminum.

9. A tool for a robot comprising:
an outer sheet having a first plurality of passages and having a first peripheral member, a first center hub and a first plurality of ribs forming a first web, the first web defining a first plurality of voids;
an inner sheet connected to the outer sheet and having a second plurality of passages and a mounting surface and having a second peripheral member, a second center hub and a second plurality of ribs forming a second web, the second web defining a second plurality of voids, the mounting surface configured to mount the tool to a proximate robot;
a plurality of spacers;
a backing plate; and
a front plate;
wherein the first plurality of passages are aligned with the second plurality of passages forming a plurality of shafts configured to accommodate one or more workpiece interface tools, the plurality of spacers are aligned with the plurality of shafts and configured to provide support for the one or more workpiece interface tools; and
wherein the front plate is attached to the first center hub of the outer sheet and the backing plate is attached to the second center hub of the inner sheet.

10. The tool of claim 9 wherein the outer sheet is connected to the inner sheet with adhesive.

11. The tool of claim 9 wherein the plurality of workpiece interface tools is a plurality of spring plungers.

12. The tool of claim 9, wherein the first peripheral member includes a first channel and the second peripheral member includes a second channel.

13. The tool of claim 9, wherein each of the first plurality of ribs comprises a third channel and each of the second plurality of ribs comprises a fourth channel.

14. The tool of claim 9, wherein the outer sheet is made of polymeric materials, thermosetting polymers, thermoplastics, or carbon fiber materials, and the inner sheet is made of polymeric materials, thermosetting polymers, thermoplastics, or carbon fiber materials.

* * * * *